(12) United States Patent
Senninger

(10) Patent No.: US 6,846,902 B2
(45) Date of Patent: Jan. 25, 2005

(54) PROCESS FOR TRAPPING RESIDUAL MONOMER WITH AN EPOXIDE FUNCTIONAL GROUP IN A THERMOPLASTIC COMPOSITION

(75) Inventor: Thierry Senninger, Hayange (FR)

(73) Assignee: Atofina S.A. (FR)

(*) Notice: Subject to any disclaimer, the term of this patent is extended or adjusted under 35 U.S.C. 154(b) by 0 days.

(21) Appl. No.: 10/268,934

(22) Filed: Oct. 11, 2002

(65) Prior Publication Data

US 2003/0088010 A1 May 8, 2003

(30) Foreign Application Priority Data

Oct. 11, 2001 (FR) .............................................. 01 13106

(51) Int. Cl.⁷ .................................................. C08F 6/28
(52) U.S. Cl. ...................... 528/482; 528/490; 524/502; 524/450; 525/407
(58) Field of Search ............................... 528/482, 490; 524/450, 502; 525/407

(56) References Cited

U.S. PATENT DOCUMENTS

| | | | |
|---|---|---|---|
| 2,200,429 A | | 5/1940 | Perrin et al. |
| 2,953,551 A | | 9/1960 | White |
| 3,350,372 A | | 10/1967 | Anspon et al. |
| 3,534,009 A | * | 10/1970 | Beresniewicz ............... 526/73 |
| 3,756,996 A | | 9/1973 | Pugh et al. |
| 3,957,920 A | * | 5/1976 | Kleiner et al. ............... 525/219 |
| 4,910,295 A | * | 3/1990 | Bernier et al. ............... 528/482 |
| 5,420,201 A | * | 5/1995 | Abe et al. ....................... 525/74 |
| 5,548,012 A | | 8/1996 | Yamamoto et al. |
| 6,025,423 A | | 2/2000 | Breant |
| 6,562,907 B2 | * | 5/2003 | Johoji et al. ................. 525/191 |
| 6,583,209 B2 | * | 6/2003 | Mehta et al. ................ 524/445 |
| 2001/0016626 A1 | | 8/2001 | Vollenberg et al. |

FOREIGN PATENT DOCUMENTS

| | | | |
|---|---|---|---|
| EP | 0650977 A1 | * | 5/1995 |
| EP | 0664317 A1 | * | 7/1995 |
| JP | 56-112983 A | * | 9/1981 |
| WO | WO 92/13029 | | 8/1992 |
| WO | WO-92/13899 A | * | 8/1992 |
| WO | WO 92/13899 | * | 8/1992 |
| WO | WO 98/25974 | | 6/1998 |
| WO | WO-98/25974 A | * | 6/1998 |
| WO | WO-02/059162 A3 | * | 8/2002 |

OTHER PUBLICATIONS

French Search Report dated Jun. 17, 2002 for Application No. FR0113106.

* cited by examiner

*Primary Examiner*—David W. Wu
*Assistant Examiner*—Henry S. Hu
(74) *Attorney, Agent, or Firm*—Hunton & Williams LLP

(57) ABSTRACT

The invention relates to a process for trapping a free monomer which has not reacted by copolymerization or by grafting comprising at least one epoxide functional group in a thermoplastic composition based on ethylene and/or on propylene and based on at least one monomer comprising at least one epoxide functional group. The process can comprise the following stages: (i) preparation of the thermoplastic composition; and (ii) addition of a sufficient amount of a solid trapping additive exhibiting, at its surface, sites with a basic nature within the Lewis or Brönstead meaning. The trapping additive comprises a porous zeolite, the diameter of the pores of which is between 5 and 15 angströms, preferably between 6 and 13 angströms. The invention also relates to the composition obtained by such a process and to the blends comprising such a composition.

11 Claims, 1 Drawing Sheet

Figure 1:
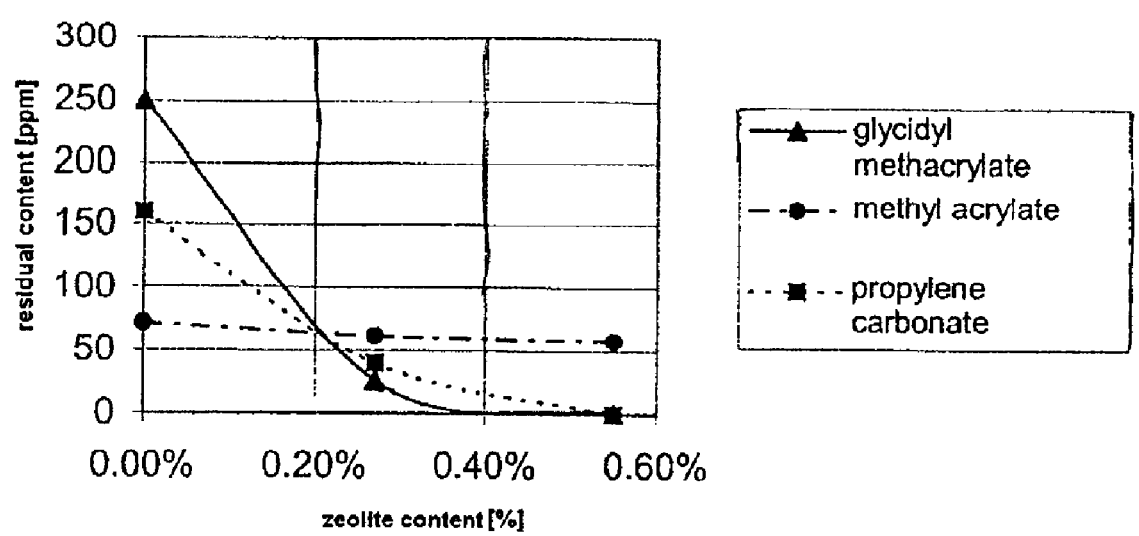

PROCESS FOR TRAPPING RESIDUAL MONOMER WITH AN EPOXIDE FUNCTIONAL GROUP IN A THERMOPLASTIC COMPOSITION

BACKGROUND OF THE INVENTION i. Field of the Invention

The invention relates to a treatment of a thermoplastic polymer comprising, in the copolymerized form or in the grafted form, a monomer with an epoxide functional group and comprising the said monomer with an epoxide functional group in the free form, also known as residual monomer, that is to say not having reacted by copolymerization or by grafting. The treatment is intended to capture the said residual monomer. The invention also relates to the compositions and the blends comprising such thermoplastic polymers obtained by the said treatment.

ii. Description of the Related Art

Several techniques are already well known in industry for reducing the content of residual compounds in polymers. A degassing can, for example, be carried out in degassing silos fed with nitrogen or with hot air. The removal of the residual compounds can also be carried out in the molten state in devices known as devolatilizers, as is the case in the manufacture of polystyrene. In this case, the molten polymer is dispersed in a chamber maintained under high vacuum, the volatile components thus being entrained under the effect of the vacuum. The devolatilization can also be carried out in an extruder equipped with one or more degassing wells.

The document WO 98/25974 relates to a composition comprising an acid-based ethylene copolymer, such as ethylene/(meth)acrylic acid. This copolymer is blended with a hydrophilic zeolite (zeolite having an $SiO_2/Al_2O_3$ ratio of less than 100, preferably of less than 35 and advantageously of less than 3; absorbing more than 10% of water at 25° C. under a pressure of 4.6 torr) so as to form a composition with a reduced content of residual monomeric acid which has not copolymerized and which is included in the polymer. In this document, no mention is made of a monomer with an epoxide functional group or of the colour of the copolymer+zeolite composition.

The document WO 92/13029 relates to a process for removing taste- and odor-generating substances from plastics. The molecules responsible for causing this trouble are not disclosed. Tests carried out with hydrophilic zeolites Sylosiv® 3A and 10A produce a weak effect as regards the removal of the substances responsible for tastes/smells, whereas the hydrophobic zeolites Abscent® give good results. In this document, no mention is made of a monomer with an epoxide functional group.

The document WO 92/13899 relates to a process for removing taste- and odor-generating substances from polyolefins. The molecules responsible for causing this trouble are not disclosed. Hydrophobic zeolites (zeolite having an $SiO2/Al_2O_3$ ratio of greater than 17, preferably of greater than 100; absorbing less than 10% of water at 25° C. under a pressure of 4.6 torr) are preferred.

Some compounds, including glycidyl methacrylate (GMA), are suspected of having a toxicological effect even in the form of trace amounts. International legislation is tending to become more restrictive regarding the level of residual compounds in polymers. The production of polymers comprising minute, indeed even zero, amounts of residual compounds is therefore proving to be an important challenge.

If the degassing technique is completely ineffective on polymer granules, the devolatilization technique in the molten state is more effective but does not make it possible to significantly reduce the amount of residual compounds. Furthermore, the solution consisting in installing a device of the vacuum devolatilizer type is a solution which demands a high capital cost.

SUMMARY OF THE INVENTION

The invention is targeted at providing a technically simple, inexpensive and nontoxic way of obtaining polymers based on ethylene and/or on propylene and on monomer(s) with an epoxide functional group comprising little or nothing at all of the residual monomer with an epoxide functional group. The invention consists in capturing this free monomer using a "trapper" suited to its chemical nature, such as a zeolite, without detrimentally affecting the coloring of the thermoplastic polymer.

In the case where the polymers are used in the composition of a food packaging (for example, film, carton, bottle), capturing the residual compound chemically and/or physically can prevent the compound from coining into direct contact with the foodstuff. Even when the polymer is diluted in a composition for the purpose of producing a very thick packaging (>5 mm) the residual compound can migrate in the composition to come into contact with the foodstuff. This is also the case when the polymer is used in the manufacture of multilayer films. The addition of zeolite as recommended by the invention can therefore prevent the detrimental change in the taste of the foodstuff by the residual compound. Furthermore, capturing in this way may possibly also result in better olfactory comfort.

It is also important, in the manufacture of a composition in which the thermoplastic polymer is used, for the zeolite not to detrimentally affect the physical properties of the thermoplastic polymer. In particular, the optical properties of the polymer are very important, such as, for example, the transparency or the color. As regards the latter, it is shown, through the examples of the present document, that some zeolites have a major impact on the color of the thermoplastic.

The thermoplastic compositions according to the invention or the blends comprising such compositions are used for the manufacture of articles, such as, for example, food cartons, wrapping films, bottles or pipes, inter alia, intended to be brought into contact with foodstuffs in the solid or liquid forms.

The invention relates to a process for trapping a free monomer which has not reacted by copolymerization or by grafting comprising at least one epoxide functional group in a thermoplastic composition based on ethylene and/or on propylene and based on at least one monomer comprising at least one epoxide functional group, the process comprising the following stages:

preparation of the thermoplastic composition, addition of a sufficient amount of a solid trapping additive exhibiting, at its surface, sites with a basic nature within the Lewis or Brönsted meaning.

According to an embodiment of the process, the trapping additive is a porous zeolite, the diameter of the pores of which is between 5 and 15 angströms, preferably between 6 and 13 angströms.

According to an embodiment of the process, the trapping additive is a zeolite having an $SiO_2/Al_2O_3$ ratio of less than 200, preferably of less than 100.

According to an embodiment of the process, the zeolite is hydrophilic, absorbing more than 10% of water at 25° C. under a pressure of 4.6 torr.

According to an embodiment of the process, the thermoplastic composition comprises:

50 to 95% by weight of ethylene and/or of propylene, 0 to 40% by weight of alkyl (meth)acrylate or of vinyl acetate, 0.1 to 15% by weight of grafted or copolymerized monomer comprising at least one epoxide functional group.

According to an embodiment of the process, the thermoplastic composition comprises:

50 to 95% by weight of ethylene, 0 to 40% by weight of methyl (meth)acrylate, 0.1 to 15% by weight of grafted or copolymerized glycidyl methacrylate.

According to an embodiment of the process, the trapping additive is added entirely or partially to the thermoplastic composition in the form of a masterbatch.

According to an embodiment of the process, the masterbatch comprises 20 to 800% by weight of a polymer constituting the base of the masterbatch and 80 to 20% by weight of the trapping additive.

According to an embodiment of the process, the base of the masterbatch is chosen from the group of following polymers: high density polyethylene, low density polyethylene, polyethylene obtained by metallocene catalysis, polypropylene, ethylene/vinyl acetate copolymer and ethylene/alkyl (meth)acrylate copolymers.

The invention also relates to a thermoplastic composition comprising:

a polymer based on ethylene and/or on propylene and based on at least one monomer comprising at least one epoxide functional group, and an additive for trapping residual monomer comprising at least one epoxide functional group which has not polymerized or which has not been grafted in the thermoplastic composition;

a residual monomer comprising at least one epoxide functional group which has not polymerized or which has not been grafted in the thermoplastic composition in a content of between 2,000 and 0 ppm.

According to an embodiment of the composition, the polymer comprises:

50 to 95% by weight of ethylene and/or of propylene, 0 to 40% by weight of alkyl (meth)acrylate or of vinyl acetate, 0.1 to 15% by weight of grafted or copolymerized monomer comprising at least one epoxide functional group.

According to an embodiment of the composition, the polymer comprises:

50 to 95% by weight of ethylene, 0 to 40% by weight of methyl (meth)acrylate, 0.1 to 15% by weight of grafted or copolymerized glycidyl methacrylate.

According to an embodiment of the composition, the trapping additive is a solid exhibiting, at its surface, sites with a basic nature within the Lewis or Brönsted meaning.

According to an embodiment of the composition, the trapping additive is a porous zeolite, the diameter of the pores of which is between 5 and 15 angströms, preferably between 6 and 13 angströms.

According to an embodiment of the composition, the trapping additive is a zeolite having an $SiO_2/Al_2O_3$ ratio of less than 200, preferably of less than 100.

According to an embodiment of the composition, the zeolite is hydrophilic, absorbing more than 10% of water at 25° C. under a pressure of 4.6 torr.

According to an embodiment of the composition, it comprises a content of residual monomer comprising at least one epoxide functional group between 2,000 and 0 ppm, between 1,000 and 0 ppm, between 150 and 0 ppm, between 100 and 0 ppm, between 50 and 0 ppm or between 5 and 0 ppm.

According to an embodiment of the composition, it comprises a content of residual propylene carbonate between 200 and 0 ppm, between 100 and 0 ppm or between 50 and 0 ppm.

The invention also relates to a blend comprising a thermoplastic composition as described above and a polyester.

According to an embodiment of the blend, the polyester is poly(ethylene terephthalate) (PET), poly(butylene terephthalate) (PBT) or their blend.

The invention relates to the use of the blend as described above in manufacturing articles.

Finally, the invention relates to a masterbatch comprising 20 to 80% by weight of a copolymer taken from the group consisting of high density polyethylene, low density polyethylene, polyethylene obtained by metallocene catalysis, polypropylene, ethylene/vinyl acetate copolymer and ethylene/alkyl (meth)acrylate copolymers and 80 to 20% by weight of trapping additive exhibiting, at its surface, sites with a basic nature within the Lewis or Brönsted meaning.

According to an embodiment of the masterbatch, the trapping additive is a porous zeolite, the diameter of the pores of which is between 5 and 15 angströms, preferably between 6 and 13 angströms, and which has an $SiO_2/Al_2O_3$ ratio of less than 200, preferably of less than 100.

DETAILED DESCRIPTION OF PREFERRED EMBODIMENTS

A process for reducing the level of free monomers with an epoxide functional group in thermoplastic polymers will now be described. The general principle of this process consists in adding, to a polymer in the molten state prepared according to a method known to a person skilled in the art, an additive capable of interacting with the residual monomer with an epoxide functional group. Without becoming involved in a very exhaustive explanation of the phenomenon concerned, the additive is capable of capturing the residual compound in cages and/or channels with graded sizes and/or of trapping it chemically. The term "trapping additive" or "trapping agent" will be used subsequently. The trapping is measured on conclusion of the treatment by analyses known to a person skilled in the art. An analysis by gas chromatography has in particular been used in our case. Subsequently, the term "residual compound" will be understood as meaning any chemical compound which is detected in the thermoplastic composition as a result of analyses of this type, in particular after the analytical operation consisting in dissolving the polymer in a solvent and in then precipitating it from a nonsolvent comprising an internal standard.

A thermoplastic composition according to the invention comprises a polymer based on ethylene and/or based on propylene and an additive for trapping a residual monomer with an epoxide functional group which has not reacted by copolymerization or by grafting.

As regards the trapping additives, mention may be made of any solid exhibiting, at its surface, sites with a basic nature within the Lewis or Brönsted meaning. Mention may be made, by way of examples, of hydrophilic zeolites having an $SiO_2/Al_2O_3$ ratio of less than 200, preferably of less than 100. The zeolites have a porous structure with pores with a diameter of between 5 and 15 angstroms, preferably between 6 and 13 angstroms. The zeolites have the ability to absorb more than 10% of water at 25° C. and under a pressure of 4.6 torr. Mention may be made, by way of examples, of the zeolite sold by W. R. Grace & Co. under the name Sylosiv® 10A.

As regards the monomer with an epoxide functional group, mention may be made, by way of examples, of:

aliphatic glycidyl esters and ethers, such as allyl glycidyl ether, vinyl glycidyl ether, glycidyl maleate, glycidyl itaconate, glycidyl acrylate or glycidyl methacrylate, and alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate As regards the polymer based on ethylene and/or on propylene, it can be chosen from the following two families of polymers:

Ethylene-based copolymers obtained by a mechanism of radical polymerization under high pressure, as disclosed, for example, in the following documents: U.S. Pat. Nos. 2,200,429, 2,953,551, 3,350,372, and 3,756,996. These copolymers can comprise:

50 t0 95% by weight of ethylene;

0 to 40% by weight of alkyl (meth) acrylate or of vinyl acetate;

0.1 to 15% by weight of monomer with an epoxide functional group, more particularly glycidyl acrylate or glycidyl methacrylate.

A monomer with an epoxide functional group is grafted onto thermoplastic polymers based on ethylene or on propylene using a radical grafting reaction. The grafting operation is well known to a person skilled in the art and can be carried out in the molten state or else in solution in an organic solvent. When the grafting reaction takes place in the molten state, an extruder is advantageously used to bring into contact the thermoplastic polymer, the monomer with an epoxide functional group and the source of free radicals used to initiate the grafting chemical reaction.

The content of grafted monomer with an epoxide functional group is between 0.1 and 15%, preferably between 0.1 and 5%, by weight.

The thermoplastic polymer based on ethylene and/or propylene onto which the monomer with an epoxide functional group is grafted will, for its part, be chosen from the following polymers:

homopolyethylenes, such as, for example:

low density polyethylene (LDPE)

high density polyethylene (HDPE)

linear low density polyethylene (LLDPE)

very low density polyethylene (VLDPE)

polyethylene obtained by metallocene catalysis, that is to say the polymers obtained by copolymerization of ethylene and of α-olefin, such as propylene, butene, hexene or octene, in the presence of a single-site catalyst generally composed of a zirconium or titanium atom and of two cyclic alkyl molecules bonded to the metal. More specifically, the metallocene catalysts are usually composed of two cyclopentadiene rings bonded to the metal. These catalysts are frequently used with aluminoxanes as cocatalysts or activators, preferably methylaluminoxane (MAO). Hafnium can also be used as metal to which the cyclopentadiene is attached. Other metallocenes can include transition metals from Groups IVA, VA and VIA. Metals from the lanthanide series can also be used.

copolymers comprising ethylene and a comonomer which can be chosen from:

α-olefins, advantageously those having from 3 to 30 carbon atoms; mention may be made, as examples of α-olefins, of propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene; these α-olefins can be used alone or as a mixture of two or of more than two, esters of unsaturated carboxylic acids, such as, for example, alkyl (meth)acrylates, it being possible for the alkyls to have up to 24 carbon atoms; examples of alkyl acrylate or methacrylate are in particular methyl methacrylate, ethyl acrylate, n-butyl acrylate, isobutyl acrylate or 2-ethylhexyl acrylate, vinyl esters of saturated carboxylic acids, such as, for example, vinyl acetate or propionate, dienes, such as, for example, 1,4-hexadiene.

The polyethylene can comprise several of the above comonomers.

homopolypropylenes copolymers comprising propylene and a comonomer which can be chosen from:

ethylene dienes, such as, for example, 1,4-hexadiene. elastomers of the type:

EPR (ethylene/propylene rubber)

EPDM (ethylene/propylene/diene)

or blends of polyethylene with a EPR or an EPDM.

Grafting is an operation known per se.

The copolymers of ethylene and of a monomer with an epoxide functional group are advantageously ethylene/alkyl (meth)acrylate/monomer with an epoxide functional group copolymers obtained by copolymerization of the monomers. They comprise from 0 to 40% by weight of alkyl (meth) acrylate, preferably 5 to 35%, and up to 15% by weight of monomer with an epoxide functional group, preferably 0.1 to 10%.

The monomer with an epoxide functional group is advantageously glycidyl methacrylate or GMA.

The alkyl (meth)acrylate is advantageously chosen from methyl acrylate, methyl methacrylate, ethyl acrylate, n-butyl acrylate, isobutyl acrylate or 2-ethyhexyl acrylate; it will preferably be butyl acrylate or methyl acrylate. The amount of alkyl (meth)acrylate is advantageously from 20 to 25% by weight. The Melt Flow Index (MFI) is advantageously between 5 and 100 (in g/10 min at 190° C. under 2.16 kg) and the melting temperature is between 60 and 110° C.

The additive for trapping free monomers with an epoxide functional group in the thermoplastic composition according to the invention can be injected in the form of pure trapping additive or alternatively in the form of a masterbatch. In this case, the masterbatch comprises 20 to 80% (by weight) of a polymer constituting the base of the said masterbatch and 80 to 20% (by weight) of the trapping additive. Mention may be made, as polymer constituting the base of the masterbatch, of: high density polyethylene (HDPE), low density polyethylene (LDPE), polyethylene obtained by metallocene catalysis, polypropylene or ethylene copolymers of the ethylene/vinyl acetate (EVA) or of the ethylene/alkyl (meth) acrylate type (such as, for example, the ethylene/methyl acrylate or ethylene/butyl acrylate copolymers sold by Atofina under the trade mark Lotryl®).

Preferably, when the polymer to be treated is an ethylene/alkyl (meth)acrylate/monomer with an epoxide functional group copolymer, the binder of the masterbatch will also be chosen from ethylene copolymers of the ethylene/vinyl acetate (EVA) or ethylene/alkyl (meth)acrylate type. Ethylene/alkyl (meth)acrylate copolymers, in particular those with the trade mark Lotryl®, will preferably be chosen. As regards the latter, the MFI will preferably be between 5 and 20 g/10 min at 190° C. under 2.16 kg.

The trapping additive, pure or included in a masterbatch, has the advantage of being able to be introduced directly into the molten polymer by virtue of a compounding operation in an extruder. It can be injected at any time, before or during the extrusion of the polymer. This results in true ease of processing. The time necessary for the trapping additive to be able to interact is between substantially 1 s and 10 min at a temperature of between substantially 0° C. and 250° C.

The trapping additive, pure or included in a masterbatch, is added in a sufficient amount to reduce the amount of free monomer in the polymer. This amount is defined by a person skilled in the art according to the result desired, that is to say according to the percentage of trapping of the free epoxide desired in the thermoplastic composition according to the invention or else according to the final content of residual compound desired.

By way of example, a polymer comprising between 100 and 1,000 ppm of free monomer with an epoxide functional group comprises between 0 and 100 ppm of residual monomer on conclusion of the treatment, it being known that between 0 and 10% (by weight), preferably between 0 and 5% (by weight) and advantageously between 0 and 2% (by weight) of pure basic zeolite have been added to the polymer.

An embodiment of the invention will now be described in more detail.

Method of Quantitatively Determining the Residual Compounds in the Copolymer

For Comparative Examples 1–3 and 7–9 and Examples 4–6, the method used to quantitatively determine the residual compounds is as follows. 2 g of polymer sample are weighed out in a sealed flask and are dissolved in tetrahydrofuran under cold conditions. The solution obtained is then heated at 50° C. for 10 minutes. The polymer is subsequently precipitated using a methanol solution comprising nonane as internal standard. The supernatant liquid is then injected into the chromatograph.

Gas chromatography (GC) conditions: helium as carrier gas, split as injection mode, BPX5 as column type, 5 m as column length, 0.32 mm as column diameter, 0.5 µm as phase thickness, 1 µl as volume injected, FID as detector, 50° C. (6 min), then rise from 50 to 260° C. at 10° C./min, as oven programming.

The various tests and comparative tests which will follow were carried out with Lotader® AX8900 (terpolymer comprising ethylene/methyl acrylate/glycidyl methacrylate (GMA)) sold by Atofina or else, for Comparative Example 9, with polystyrene Lacqrène® 1450N sold by Atofina.

The batches of Lotader® AX8900 which were used comprise between 50 and 1 000 ppm by weight of free GMA.

COMPARATIVE EXAMPLE 1

In order to demonstrate the free GMA, a boat containing Lotader® AX8900 granules is placed in a glass tube flushed with a stream of nitrogen (20 ml/min).

The glass tube is heated at 50° C. for several hours (0, 4 and 8 hours) and the gas stream is trapped in water. The content of residual GMA in the Lotader® AX8900 present in the boat is subsequently determined by GC according to the method described above. The results are listed in Table 1.

TABLE 1

| TIME (in hours) | Concentration of free GMA in the copolymer (in ppm) | % by weight of free GMA liberated |
|---|---|---|
| 0 | 325 | 0 |
| 4 | 250 | 23 |
| 8 | 145 | 55 |

The "residual" or "free" GMA in the copolymer corresponds to the GMA monomer which has not copolymerized and which remains included in the copolymer body at ambient temperature. As shown in Table 1, at constant temperature (50° C.), the percentage of GMA liberated increases as a function of the time. After 8 hours, approximately half the residual GMA is liberated.

It is found that the residual GMA included in Lotader® AX8900 granules degasses at a constant temperature of 50° C. but slowly over a period of time of several hours.

COMPARATIVE EXAMPLE 2

The Lotader® AX8900 copolymer (composition described above) is extruded using a Fairex® 45/26D extruder at a screw speed=40 rev/min according to the following extrusion conditions. The extruder is defined in five regions ranging from region 1 to region 5. Region 5 is closest to the die of the extruder, while region 1 is the furthest region from the die. In the case where the temperatures T of the regions are as follows: T region 1=177° C., T region 2=196° C., T region 3=199° C., T region 4=200° C., T region 5=201° C., T die=191° C., it is found, after analysis by GC and according to the method of quantitative determination defined above, that the copolymer entering region 1 has an initial content of residual GMA of the order of 177 ppm and a content of residual GMA at the outlet of the die of the order of 175 ppm.

The extrusion alone of the copolymer does not make it possible to significantly remove the residual GMA in Lotader® AX8900.

Measurements have made it possible to show that it is the same for the methyl acrylate and the propylene carbonate used as solvent: the extrusion alone of the copolymer does not make it possible to significantly remove the residual methyl acrylate and the residual propylene carbonate.

COMPARATIVE EXAMPLE 3

A basket containing Lotader® AX8900 granules comprising 100 ppm of free GMA is placed in a glass tube flushed with a stream of nitrogen (20 ml/min). The glass tube is heated at a constant temperature of 25° C. for 24 hours. After 24 hours, the granules no longer have a noticeable smell of GMA. However, quantitative determination of the free GMA in the copolymer shows that 70 ppm of free GMA remains in the copolymer.

It is therefore found that, even in the absence of smell of GMA, the copolymer can still include a not insignificant amount of free GMA.

EXAMPLE 4

Example 4 illustrates the invention. The same extruder as that described in Comparative Example 2 and the same extrusion conditions as those defined in Comparative Example 2 are used. The difference between Comparative Example 2 and Example 4 lies in the injection into the extruder, during the extrusion of the Lotader® AX8900 copolymer, of 1% by weight of micronized basic zeolite Sylosiv® 10A sold by W. R. Grace & Co., which is highly porous with a mean diameter of the pores of 10 angstroms. The pH of this zeolite at 5% in water, measured according to the method of DIN EN ISO 787-9, is 11.5. The Lotader® AX8900 copolymer and the zeolite are coextruded.

It was found, after analysis by GC and according to the method of quantitative determination defined above, that the copolymer entering region 1 of the extruder has an initial content of free GMA of 70 ppm and a content of free GMA at the outlet of the die of less than 5 ppm.

A $^1$H NMR analysis of the copolymer resulting from the extrusion of Example 4 made it possible to show that the content of copolymerized GMA is nor affected by the treatment. The polymer granules on conclusion of the extrusion are colorless.

EXAMPLE 5

A masterbatch comprising:

80% by weight of Lotryl® 20MA08: ethylene/methyl acrylate (80/20) copolymer with a melt flow index, abbreviated to MFI,=8 g/10 min (NFT 51-016); and 20% by weight of zeolite Sylosiv® 10A defined above, is prepared on a Werner 40 extruder at a temperature of 180° C.

1.37% by weight of the masterbatch is subsequently diluted in 98.63% by weight of Lotader® AX8900 on a Fairex® 45/26D extruder. The content of zeolite Sylosiv® 10A in the granules exiting from the extruder is therefore 0.27% by weight. The same extruder as that described in Comparative Example 2 and the same extrusion conditions as those defined in Comparative Example 2 are used.

It is found, after analysis by GC and according to the method of quantitative determination defined above, that the copolymer entering region 1 has an initial content of residual GMA of the order of 250 ppm and a content of residual GMA at the outlet of the die of the order of 26 ppm. The polymer granules on conclusion of the extrusion are colorless.

Quantitative determination was also carried out on two other residual compounds of the copolymer: the methyl acrylate and the propylene carbonate used as solvent (Table 2).

TABLE 2

| | Contents in ppm (% remaining) | | |
|---|---|---|---|
| | GMA | Methyl acrylate | Propylene carbonate |
| Inlet of the extruder | 250 | 72 | 160 |
| Outlet of the extruder | 26 (10%) | 62 (86%) | 40 (25%) |

It is found that the zeolite is more effective with regard to the GMA than with regard to the methyl acrylate, although these two compounds belong to the same chemical family of the esters.

EXAMPLE 6

The same test is carried out as in Example 5 but with 2.75% of masterbatch diluted in 97.25% by weight of Lotader® AX8900, i.e. a content of zeolite Sylosiv® 10A in the granules exiting from the extruder of 0.55% by weight.

It is found, after analysis by GC and according to the method of quantitative determination defined above, that the copolymer entering region 1 of the extruder has an initial content of free GMA of 250 ppm and a content of free GMA at the outlet of the die of less than 5 ppm. The polymer granules on conclusion of the extrusion are colorless.

Quantitative determination was also carried out on two other residual compounds of the copolymer: the methyl acrylate and the propylene carbonate used as solvent (Table 3).

TABLE 3

| | Contents in ppm (% remaining) | | |
|---|---|---|---|
| | GMA | Methyl acrylate | Propylene carbonate |
| Inlet of the extruder | 250 | 72 | 160 |
| Outlet of the extruder | <5 (<2%) | 58 (80%) | <5 (<3%) |

Examples 5 and 6 show that the content of free GMA can be lowered even in the presence of basic zeolite predispersed in a masterbatch and that the content of free GMA can be lowered by modifying the content of basic zeolite in the thermoplastic polymer.

It is found that the zeolite is much more effective with regard to the GMA than with regard to the methyl acrylate, although these two compounds belong to the same chemical family of the esters. To achieve a more precise awareness thereof, the content of residual compounds (in ppm) can be plotted as a function of the content of zeolite (% by weight in the composition) in the granules (see FIG. 1). The slope of the curve thus obtained is an indicator of the effectiveness of the zeolite for the various residual compounds. The more negative the slope, the greater the effectiveness.

TABLE 4

| | GMA | Methyl acrylate | Propylene carbonate |
|---|---|---|---|
| Effectiveness (ppm/%) | −45 230 | −2 539 | −29 000 |

It is found that the zeolite has an effectiveness which is more marked for the glycidyl methacrylate than for the methyl acrylate.

COMPARATIVE EXAMPLE 7

The same test is carried out as in Example 4 but with 1% of basic zeolite Sylosiv® 4A instead of a zeolite Sylosiv® 10A. This zeolite Sylosiv® 4A, micronized and highly porous, with a mean diameter of the pores of 4 angstroms, is sold by W. R. Grace & Co. The pH of this zeolite at 5% in water, measured according to the method of DIN EN ISO 787-9, is 11.5. The Lotader® AX8900 copolymer and the zeolite are coextruded.

It is found, after analysis by GC and according to the method of quantitative determination defined above, that the copolymer entering region 1 of the extruder has an initial content of free GMA of 55 ppm and a content of free GMA at the outlet of the die of 55 ppm. The polymer granules on conclusion of the extrusion are colorless.

COMPARATIVE EXAMPLE 8

The same test is carried out as in Example 4 but with 1% of zeolite Abscents® 1000 instead of a zeolite Sylosiv® 10A. The zeolite Abscents® 1000 is sold by UOP, with a mean diameter of the pores >5 angstroms. The zeolite Abscents® 1000 is a hydrophobic zeolite.

It is found, after analysis by GC and according to the method of quantitative determination defined above, that the copolymer entering region 1 of the extruder has an initial content of free GMA of 55 ppm and a content of free GMA at the outlet of the die of less than 5 ppm. The polymer granules on conclusion of the extrusion are strongly brown in color.

This comparative example illustrates the fact that a zeolite can be effective in removing the GMA but unusable because of the coloring which it brings about.

COMPARATIVE EXAMPLE 9

The same test is carried out as in Example 4 but with Lacqrène® 1450N as polystyrene polymer. The method of quantitative determination of the styrene monomer is identical to that used for the quantitative determination of GMA.

It is found, after analysis by GC, that the polymer entering region 1 of the extruder has an initial content of free styrene of 250 ppm and a content of free styrene at the outlet of the die of 250 ppm. The zeolite has therefore had no affect on the removal of the residual styrene.

TABLE 5

| Test | Method of treatment of the polymer | % of free monomer remaining in the polymer after its treatment | Coloring of the granules after the treatment |
| --- | --- | --- | --- |
| Comparative Example 1 | Degassing at 50° C. for 8 h | 45% (GMA) | no change |
| Comparative Example 2 | Extrusion alone | 99% (GMA) | no change |
| Comparative Example 3 | Degassing at 25° C. for 24 h | 70% (GMA) | no change |
| Example 4 | Extrusion with zeolite 1% Sylosiv ® 10A | <7% (GMA) | no change |
| Example 5 | Extrusion with masterbatch Lotryl ® + Sylosiv ® 10A | 10% (GMA) | no change |
| Example 6 | Extrusion with masterbatch Lotryl ® + Sylosiv ® 10A | <2% (GMA) | no change |
| Comparative Example 7 | Extrusion with zeolite Sylosiv ® 4A | 100% (GMA) | no change |
| Comparative Example 8 | Extrusion with zeolite Abscents ® 1000 | 9% (GMA) | strong brown coloring |
| Comparative Example 9 | Extrusion of PS with zeolite Sylosiv ® 10A | 100% (styrene) | no change |

Table 5 above makes it possible to summarize the % of free monomer remaining in the polymer after treatment of the polymer.

The proportion of residual GMA liberated depends mainly on the temperature of the reaction, on the duration of the reaction, on the pressure, on the amount of free GMA to be trapped and on the amount of trapping additive introduced into the copolymer. As regards this last point, the more trapping additive is added, the more the free GMA will be trapped in the copolymer, until a plateau is reached where it will no longer be of any use to add further trapping additive because all the free GMA will have been trapped.

In the light of these examples and comparative examples, our invention makes it possible to have available a zeolite:
- capable of reducing the content of residual GMA without affecting the color of the polymer (see Example 4 with Comparative Example 8 and Example 4 with Comparative Example 7),
- effective with regard to a monomer comprising a given chemical function group and ineffective with regard to another not comprising this same chemical functional group (see Example 4 with GMA and Comparative Example 9 with styrene),
- effective with regard to a monomer of a certain chemical family but not as effective with regard to another monomer of the same chemical family, such as acrylates (see Example 5 and Example 6 with GMA and methyl acrylate).

It is therefore necessary to precisely adjust the zeolite to the residual compound which it is desired to trap.

What is claimed is:

1. A process for trapping a free monomer which has not reacted by copolymerization or by grafting comprising at least one epoxide functional group in a thermoplastic composition, said process comprising the steps of:
    providing a thermoplastic composition based on ethylene and/or on propylene and based on at least one monomer comprising at least one epoxide functional group;
    adding to said thermoplastic composition a sufficient amount of a solid trapping additive exhibiting, at its surface, sites with a basic nature within the Lewis or Brönsted meaning.

2. The process according to claim 1, wherein the trapping additive is a porous zeolite, the diameter of the pores of which is between 5 and 15 angstroms.

3. The process according to claim 2, wherein the diameter of the pores is between 6 and 13 angstroms.

4. The process according to claim 2, wherein the trapping additive is a zeolite having an $SiO_2/Al_2O_3$ ratio of less than 200.

5. The process according to claim 4, wherein the ratio is less than 100.

6. The process according to claims 2 or 4, wherein the zeolite is hydrophilic, absorbing more than 10% of water at 25° C. under a pressure of 4.6 torr.

7. The process according to claim 1, wherein the thermoplastic composition comprises:
    50 to 95% by weight of ethylene and/or of propylene,
    0 to 40% by weight of alkyl (meth)acrylate or of vinyl acetate,
    0.1 to 15% by weight of grafted or copolymerized monomer comprising at least one epoxide functional group.

8. The process according to claim 7, wherein the thermoplastic composition comprises:
    50 to 95% by weight of ethylene,
    0 to 40% by weight of methyl (meth)acrylate, and
    0.1 to 15% by weight of grafted or copolymerized glycidyl methacrylate.

9. The process according to claim 1, further comprising the step of adding the trapping additive entirely or partially to the thermoplastic composition in the form of a masterbatch.

10. The process according to claim 9, wherein the masterbatch comprises 20 to 80% by weight of a polymer constituting the base of the said masterbatch and 80 to 20% by weight of the trapping additive.

11. The process according to claim 10, wherein the base of the masterbatch comprises high density polyethylene, low density polyethylene, polyethylene obtained by metallocene catalysis, polypropylene, ethylene/vinyl acetate copolymer, an ethylene/alkyl (meth) acrylate copolymer, or a combination thereof.

* * * * *